United States Patent
Billich

(10) Patent No.: US 12,434,760 B2
(45) Date of Patent: Oct. 7, 2025

(54) APPARATUS FOR OPERATING A LOAD-CONTROLLED HYDRAULIC SUPPLY OF AN AGRICULTURAL TRACTOR

(71) Applicant: DEERE & COMPANY, Moline, IL (US)

(72) Inventor: Manuel Billich, Dornstadt (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/611,783

(22) Filed: Mar. 21, 2024

(65) Prior Publication Data
US 2024/0359730 A1   Oct. 31, 2024

(30) Foreign Application Priority Data

Apr. 27, 2023  (DE) .......................... 102023110913.8
May 22, 2023  (DE) .......................... 102023113309.8

(51) Int. Cl.
| | | |
|---|---|---|
| B62D 5/07 | (2006.01) | |
| B60T 13/18 | (2006.01) | |
| B60T 13/68 | (2006.01) | |
| F15B 11/16 | (2006.01) | |

(52) U.S. Cl.
CPC .............. B62D 5/075 (2013.01); B60T 13/18 (2013.01); B60T 13/686 (2013.01); F15B 11/162 (2013.01)

(58) Field of Classification Search
CPC ....... B60T 13/18; B60T 13/686; B62D 5/075; F15B 11/162
See application file for complete search history.

(56) References Cited

U.S. PATENT DOCUMENTS

| | | | | |
|---|---|---|---|---|
| 5,918,558 | A * | 7/1999 | Susag ................... | F15B 11/162 60/413 |
| 9,097,268 | B2 | 8/2015 | Wu et al. | |
| 2006/0196179 | A1 * | 9/2006 | Kesavan ............... | B60T 13/686 60/413 |

(Continued)

FOREIGN PATENT DOCUMENTS

| | | |
|---|---|---|
| DE | 10060187 A1 | 7/2001 |
| DE | 102008048054 A1 | 3/2010 |
| EP | 4083444 A1 | 11/2022 |

OTHER PUBLICATIONS

Extended European Search Report and Written Opinion issued in European Patent Application No. 24166817.7 dated Sep. 4, 2024, in 20 pages.

*Primary Examiner* — Matthew Wiblin

(57) ABSTRACT

An apparatus for operating a load-controlled hydraulic supply of an agricultural tractor includes a hydraulic pump which is adjustable with respect to the displacement volume for supplying pressurized hydraulic fluid, a proportional valve which is electrically actuatable, a primary hydraulic consumer to carry out a superordinate hydraulic function and to be directly connected to a conveying outlet of the hydraulic pump, a secondary hydraulic consumer to carry out a subordinate hydraulic function and to be connected to the conveying outlet of the hydraulic pump via the proportional valve, and a control unit configured to move the proportional valve into a closed valve position when the control unit recognizes that at least one of a required power of the primary and secondary hydraulic consumers exceeds the conveying capacity of the hydraulic pump and the subordinate hydraulic function of the secondary hydraulic consumer is inactive.

14 Claims, 1 Drawing Sheet

(56) References Cited

U.S. PATENT DOCUMENTS

| | | | |
|---|---|---|---|
| 2010/0242464 A1* | 9/2010 | Vigholm | E02F 9/2296 |
| | | | 60/327 |
| 2011/0146258 A1 | 6/2011 | Peters | |
| 2011/0252778 A1* | 10/2011 | Bitter | F15B 11/162 |
| | | | 60/422 |
| 2012/0233996 A1 | 9/2012 | Quinnell et al. | |
| 2013/0220425 A1 | 8/2013 | Pomeroy et al. | |
| 2014/0116038 A1* | 5/2014 | Pfaff | E02F 9/2228 |
| | | | 60/327 |
| 2018/0222522 A1* | 8/2018 | Schick | F15B 13/00 |
| 2024/0200579 A1* | 6/2024 | Desseux | B66F 11/044 |
| 2025/0003430 A1* | 1/2025 | Billich | F15B 11/165 |

* cited by examiner

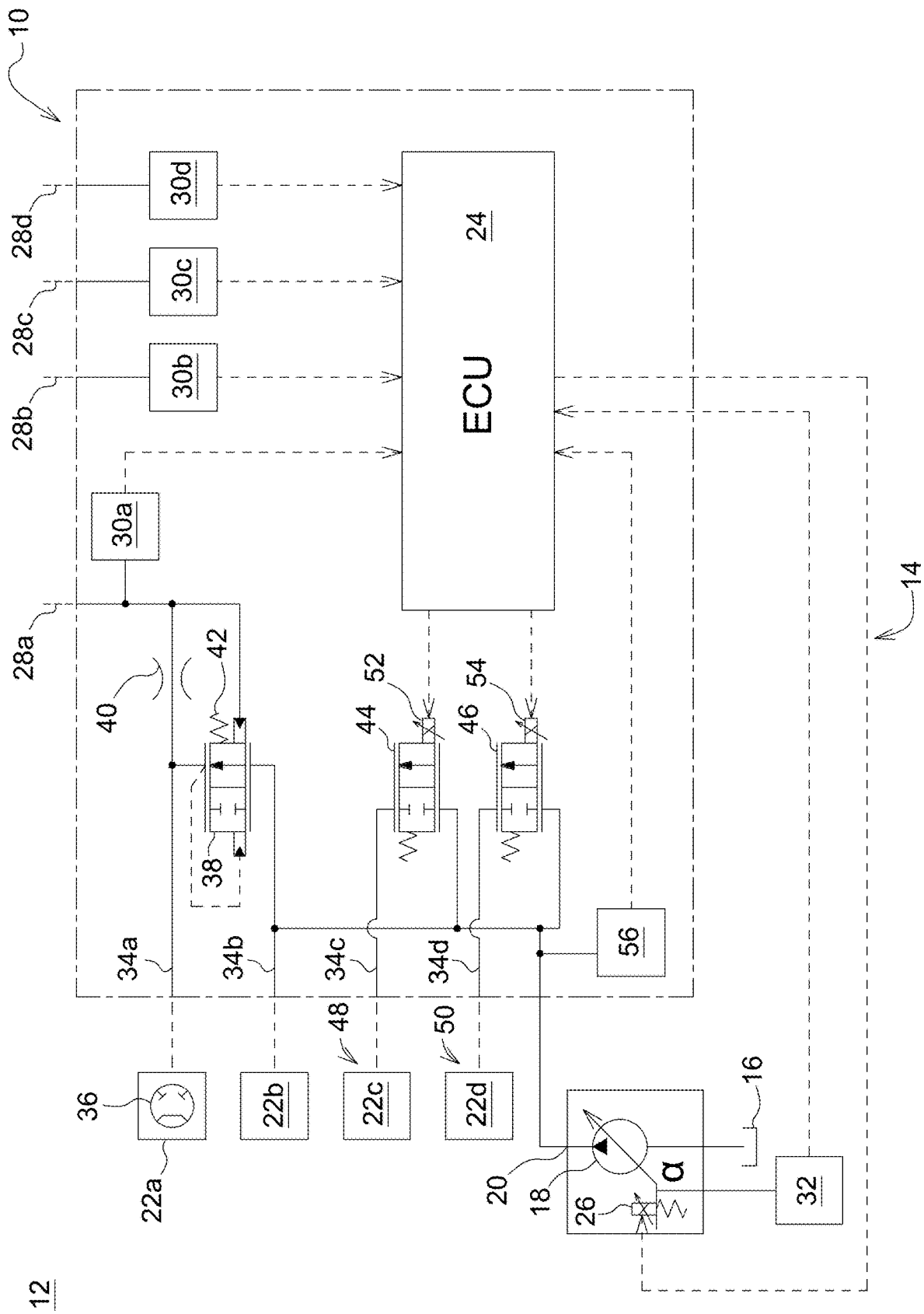

APPARATUS FOR OPERATING A LOAD-CONTROLLED HYDRAULIC SUPPLY OF AN AGRICULTURAL TRACTOR

CROSS-REFERENCE TO RELATED APPLICATIONS

This application claims priority to German Patent Application No. 102023110913.8, filed Apr. 27, 2023, and German Patent Application No. 102023113309.8, filed May 22, 2023, which are hereby incorporated by reference.

FIELD OF THE DISCLOSURE

The disclosure relates to an apparatus for operating a load-controlled hydraulic supply of an agricultural tractor, having a hydraulic pump, which is adjustable with respect to the displacement volume thereof, for supplying a hydraulic consumer with pressurized hydraulic fluid.

BACKGROUND

The use of load-controlled hydraulic systems for operating hydraulic consumers constitutes a conventional measure in agricultural tractors.

SUMMARY

To this end, the hydraulic system comprises a hydraulic pump which is supplied with hydraulic fluid from a hydraulic reservoir of the agricultural tractor and the displacement volume of which can be adapted in accordance with a reported load pressure which is applied at a control input. In this manner, a hydraulic (energy) supply of a large number of hydraulic consumers in accordance with the actual power requirement is possible. Since one and the same hydraulic pump, the conveying capacity of which is, however, limited, is used for operation of the hydraulic consumers, different supply priorities are generally assigned to the hydraulic consumers. Thus, hydraulic braking and steering systems constitute superordinate hydraulic functions with the highest supply priority. An inadequate supply which leads to possible function impairments is intended to be excluded as far as possible in these hydraulic consumers. Accordingly, a lower supply priority is assigned to hydraulic consumers which are used to carry out subordinate hydraulic functions with the objective of limiting the hydraulic supply thereof where necessary in favor of the consumers of the hydraulic consumers with the highest supply priority. The subordinate hydraulic functions include the functions which relate to operating comfort and working functions of the agricultural tractor, such as, for example, a hydraulic axle suspension or cab suspension, a working hydraulic unit including the supply of hydraulically operated working units of an additional or mounted device which is attached to the agricultural tractor, but also a hydraulically actuatable three-point power lift.

In conventional hydraulic systems, compliance with the supply priorities is carried out in a purely hydraulic manner by means of a hydraulic logic control unit, which requires an accordingly high technical complexity or structural spatial requirement as a result of the valve subassemblies and hydraulic connection lines intended to be used.

Therefore, an object of the present disclosure is to provide an apparatus of the type mentioned in the introduction which is improved with respect to the technical complexity or structural spatial requirement thereof.

This object is achieved by an apparatus for operating a load-controlled hydraulic supply of an agricultural tractor having the features of one or more embodiments disclosed herein.

The apparatus for operating a load-controlled hydraulic supply of an agricultural tractor comprises a hydraulic pump which is adjustable with respect to the displacement volume thereof for supplying a hydraulic consumer with pressurized hydraulic fluid. According to the disclosure a primary hydraulic consumer which is provided to carry out a superordinate hydraulic function is or can be connected to a conveying outlet of the hydraulic pump directly and a secondary hydraulic consumer which is provided to carry out a subordinate hydraulic function is or can be connected to a conveying outlet of the hydraulic pump via an interposed, electrically actuatable proportional valve, wherein the proportional valve is moved by a control unit (e.g., a controller including a processor and memory) into a closed valve position when the control unit recognizes that the required power of the hydraulic consumers exceeds the conveying capacity of the hydraulic pump and/or the hydraulic function which is assigned to the secondary hydraulic consumer is inactive.

It is thereby possible to achieve an energy saving with respect to inactive hydraulic functions of secondary hydraulic consumers by selectively throttling the hydraulic volume which passes through the proportional valve in addition to prioritizing the hydraulic supply of the primary hydraulic consumer. The control of the proportional valve can also be carried out in such a manner that a prioritization of the hydraulic supply of the primary hydraulic consumer is carried out primarily at the expense of secondary hydraulic consumers with an inactive hydraulic function. In such a case, undesirable limitations of active hydraulic functions by unnecessarily throttling the hydraulic supply are substantially avoided. In this instance, a hydraulic axle or cab suspension which is inactive when the agricultural tractor is stationary may be mentioned as an example.

By using a compact electrically actuatable proportional valve, the apparatus according to the disclosure is characterized by a particularly good relationship between the technical complexity which has to be operated and the structural spatial requirement, in particular also as a result of the circumstance that the actual logic control unit can be implemented in terms of software in the control unit so that the required hardware can be minimized.

It is also possible to map the static and dynamic properties of the hardware components used by associating corresponding parameters in the software and to adapt them slightly where necessary.

Advantageous embodiments of the apparatus according to the disclosure will be appreciated from the one or more embodiments disclosed herein.

For example, the control unit concludes that there is a power requirement, which exceeds the conveying capacity of the hydraulic pump, of the primary or secondary hydraulic consumers when the hydraulic pump takes up an operating state which indicates a maximum displacement volume or approaches it. Such an operating state being reached constitutes a reliable indication of a potentially imminent inadequate supply of the primary hydraulic consumer. If this critical state is not reached, the proportional valve is in the completely open position thereof.

Generally, the displacement volume of the hydraulic pump is adjusted by the control unit in accordance with a load requirement, which represents a respective reported load pressure, of the primary or secondary hydraulic consumer, wherein the control unit concludes that there is a power requirement which exceeds the conveying capacity of the hydraulic pump if it recognizes that an admissible pressure difference between a system pressure, which is applied at the conveying outlet of the hydraulic pump, and the highest reported load pressure of the hydraulic consumers is fallen below. Depending on the hydraulic pump used, the pressure difference is in the range from 10 to 30 bar and ensures an adjustment, which is tolerant with respect to pressure-reducing power losses of the reported load pressure communicated to the control unit, of the displacement volume. The predetermined pressure difference being fallen below provides an additional indication of a potentially imminent inadequate supply of the primary hydraulic consumer, the additional consideration of which substantially excludes relevant incorrect interpretations. In order to detect the system pressure, a pressure sensor which is associated with the conveying outlet of the hydraulic pump and the sensor signals of which are supplied to the control unit for evaluation can be used.

In an embodiment, the control unit recognizes the operating state, which indicates a maximum displacement volume, of the hydraulic pump by evaluating a pump swivel angle. The displacement volume usually increases continuously with the value of the pump swivel angle. Accordingly, the available conveying capacity of the hydraulic pump being reached can be recognized in that the pump swivel angle takes up a completely redirected state in the direction of an end stop. The detection of the pump swivel angle is carried out, for example, by means of a swivel angle sensor, the sensor signals of which are also supplied to the control unit for evaluation.

It is further possible for a plurality of secondary hydraulic consumers, which can be connected to the conveying outlet of the hydraulic pump via separate proportional valves, to be provided, wherein the proportional valves are brought into a closed position synchronously and/or in a predetermined sequence by the control unit in order to reduce the power requirement in accordance with the conveying capacity of the hydraulic pump. The last aspect occurs gradually in order to reproduce an adequate hydraulic supply of the primary hydraulic consumer. It is thereby possible to bring about a further subdivision or gradation of the supply priorities of the secondary hydraulic consumers so that the operation of specific hydraulic functions can be maintained as far as possible.

In order to prevent damage, caused by excess pressure, to the hydraulic system or the hydraulic consumers or peripheral components which are operated therewith, there may be provision for the system pressure which is applied at the conveying outlet of the hydraulic pump to be limited by the control unit by adapting the pump swivel angle and therefore the displacement volume. The system pressure is limited in this case in accordance with an admissible maximum value in the order of magnitude of from 200 to 250 bar.

Typically, the primary hydraulic consumer comprises, in addition to a hydraulic braking system, a hydrostatic vehicle steering system with a steering orbitrol and a pressure control valve which is connected upstream of the steering orbitrol and which is actuated in accordance with a pressure difference which decreases across a throttle element in accordance with a reported load pressure which represents a load requirement of the hydrostatic vehicle steering system. Load peaks which are expressed as a short-term increase of the reported load pressure and which occur during operation of the hydrostatic vehicle steering system result in actuation of the pressure control valve in the direction of a "through" position, which, as a result of the short control path, results in a particularly fast-reacting and therefore "dynamic" adaptation of a supply pressure which is provided for operating the hydrostatic vehicle steering system. To this end, the pressure difference is predetermined in the order of magnitude of from 10 to 20 bar.

The slight but continuous flow of hydraulic fluid through the throttle element in the region of from 1 to 5 liters per minute further ensures that a temperature gradient which is present within the hydraulic circuit of the hydrostatic vehicle steering system in the case of a cold start of the agricultural tractor is rapidly overcome, a jamming particularly of the steering orbitrol as a result of thermal differences or mechanical stresses caused thereby does not occur. This is particularly relevant at low or wintry exterior temperatures.

Additionally or alternatively, a supply pressure which is provided for operating the primary hydraulic consumer can be limited by the control unit by adapting the pump swivel angle and therefore the displacement volume of the hydraulic pump. The limitation is carried out to a value below the permissible maximum value of the system pressure and is, for example, in the order of magnitude of from 170 to 200 bar in the event that the primary hydraulic consumer is a hydrostatic vehicle steering system. The current supply pressure can be derived by the control unit from the reported load pressure, which is communicated by the hydrostatic vehicle steering system to the control unit (where applicable taking into consideration the pressure difference which decreases across the above-mentioned throttle element).

In order to detect the reported load pressure which is communicated by the primary or secondary hydraulic consumers, a pressure sensor which is arranged in a respective reported load line and the sensor signals of which are supplied to the control unit for evaluation is typically used. In the event of a plurality of hydraulic consumers, the control unit selects the respective maximum reported load pressure for adjusting the system pressure by accordingly adapting the pump swivel angle by means of an associated electrically actuatable actuator. Together with the sensor signals, which are reported to the control unit, of the swivel angle sensor, a control circuit for the pump swivel angle which has to be adjusted is thus formed.

The above and other features will become apparent from the following detailed description and accompanying drawings.

BRIEF DESCRIPTION OF THE DRAWINGS

The detailed description refers to the accompanying FIGURE(s) in which:

FIG. 1 shows an exemplary embodiment of an apparatus for operating a load-controlled hydraulic supply of an agricultural tractor (not illustrated).

DETAILED DESCRIPTION

The embodiments or implementations disclosed in the above drawings and the following detailed description are not intended to be exhaustive or to limit the present disclosure to these embodiments or implementations.

The apparatus 14 which is included by a hydraulic system 10 of the agricultural tractor 12 has a hydraulic pump 18, which is supplied with hydraulic fluid from a hydraulic reservoir 16 and which is adjustable with respect to the displacement volume thereof and which has a conveying outlet 20 for supplying a large number of hydraulic consumers 22a, 22b, 22c, 22d with pressurized hydraulic fluid.

The adjustment of the displacement volume of the hydraulic pump 18 is carried out by adapting a pump swivel angle α by means of an actuator 26 which can be electrically actuated by a control unit 24 (e.g., a controller including a processor and memory), in accordance with a load requirement, which is represented by a respective reported load pressure LS_P1S, LS_P1B, LS_P2, LS_P3, of the hydraulic consumers 22a, 22b, 22c, 22d. In order to detect the reported load pressure LS_P1S, LS_P1B, LS_P2, LS_P3, a pressure sensor 30a, 30b, 30c, 30d which is arranged in a respective reported load line 28a, 28b, 28c, 28d and the sensor signals of which are supplied to the control unit 24 for evaluation, is used. Together with the sensor signals, which are reported to the control unit 24, of a swivel angle sensor 32, a control circuit for the pump swivel angle α which is intended to be adjusted is thus formed. In this case, the control unit 24 adjusts a system pressure P, which corresponds to the maximum detected reported load pressure LS_P1S, LS_P1B, LS_P2, LS_P3, at the conveying outlet 20 of the hydraulic pump 18.

The hydraulic consumers 22a, 22b, 22c, 22d are subdivided into primary hydraulic consumers 22a, 22b and secondary hydraulic consumers 22c, 22d. The primary hydraulic consumers 22a, 22b are used to carry out superordinate hydraulic functions of a hydraulic braking system and a hydrostatic vehicle steering system, whereas subordinate hydraulic functions which are carried out by the secondary hydraulic consumers 22c, 22d relate to operating comfort and working functions of the agricultural tractor 12, such as, for example, a hydraulic axle or cab suspension, a working hydraulic unit including supplying hydraulically operated working units of an additional or mounted device which is attached to the agricultural tractor 12 but also of a hydraulically actuatable three-point power lifter. A supply pressure P_P1S, P_P1B, P_P2, P_P3 which is suitable for operating the relevant primary or secondary hydraulic consumer 22a, 22b, 22c, 22d is available at a respective supply line 34a, 34b, 34c, 34d.

The hydrostatic vehicle steering system which is included by the agricultural tractor 12 is of conventional construction type and has a steering orbitrol 36, which is merely schematically indicated, and a pressure control valve 38 which is connected upstream of the steering orbitrol 36 and which is actuated in accordance with a pressure difference, which decreases across the throttle element 40, counter to a restoring force which is applied by means of a resilient element 42 in accordance with a load requirement, which is represented by the reported load pressure LS_P1S, of the hydrostatic vehicle steering system. The remaining components of the hydrostatic vehicle steering system, such as, for example, a steering handle, a hydraulic steering cylinder and the like, are not depicted for reasons of clarity. Load peaks which are expressed as a short-term increase of the reported load pressure LS_P1S and which occur during operation of the hydrostatic vehicle steering system result in actuation of the pressure control valve 38 counter to the restoring force of the resilient element 42 in the direction of a "through" position, which, as a result of the short control path, results in a particularly fast-reacting and therefore "dynamic" adaptation of the supply pressure P_P1S which is provided for operating the hydrostatic vehicle steering system. To this end, the pressure difference is predetermined in the order of magnitude of from 10 to 20 bar.

The slight but continuous flow of hydraulic fluid through the throttle element 40 in the region of from 1 to 5 liters per minute further ensures that a temperature gradient which is present within the hydraulic circuit of the hydrostatic vehicle steering system in the case of a cold start of the agricultural tractor 12 is rapidly overcome, a jamming particularly of the steering orbitrol 36 as a result of thermal differences or mechanical stresses caused thereby does not occur. This is particularly relevant at low or wintry external temperatures.

As can further be seen in FIG. 1, the primary hydraulic consumers 22a, 22b are or can be connected directly to the conveying outlet 20 of the hydraulic pump 18 but the secondary hydraulic consumers 22c, 22d are or can be connected via interposed electrically actuatable proportional valves 44, 46 to the conveying outlet 20 of the hydraulic pump 18. The secondary hydraulic consumers 22c, 22d are subdivided into first or second groups 48, 50, wherein each of the two groups 48, 50 can be connected to the conveying outlet 20 of the hydraulic pump 18 via a separate first or second proportional valve 44, 46. The illustration of two groups 48, 50 is intended in this case to have a merely exemplary character and there may also be provided a number of groups or proportional valves which is different therefrom.

If the control unit 24 recognizes that the required power of the primary or secondary hydraulic consumers 22a, 22b, 22c, 22d exceeds the conveying capacity of the hydraulic pump 18 and/or a hydraulic function which is associated with the secondary hydraulic consumers 22c, 22d is inactive, it brings the proportional valves 44, 46 into a closed valve position by adjusting a first or second electrical actuator 52, 54. This allows an energy saving to be implemented with respect to inactive hydraulic functions of secondary consumers 22c, 22d by selectively throttling the hydraulic volume flow which passes through the proportional valves 44, 46 in addition to prioritizing the hydraulic supply of the primary hydraulic consumers 22a, 22b. According to an optional embodiment of the apparatus 14, the control unit 24 controls the proportional valves 44, 46 in such a manner that a prioritization of the hydraulic supply of the primary hydraulic consumers 22a, 22b is carried out primarily at the expense of secondary hydraulic consumers 22c, 22d with an inactive hydraulic function. Undesirable limitations of active hydraulic functions as a result of unnecessary throttling of the hydraulic supply are thus substantially avoided. In this instance, a hydraulic axle or cab suspension, which is inactive when the agricultural tractor 12 is stationary, may be mentioned as an example.

If, in accordance with the exemplary embodiment of the apparatus 14 as depicted in FIG. 1, a plurality of proportional valves 44, 46 are provided, they are brought into the closed position thereof in order to reduce the power requirement in accordance with the conveying capacity of the hydraulic pump 18 in a predetermined sequence. This is carried out gradually in order to reproduce an adequate hydraulic supply of the primary hydraulic consumers 22a, 22b. It is thereby possible to bring about an additional subdivision or gradation of the supply priorities of the secondary hydraulic consumers 22c, 22d so that the operation of specific hydraulic functions can be maintained as far as possible. Thus, it is possible to make provision with respect to the sequence of the throttling of the hydraulic volume flow which passes through the proportional valves 44, 46 for initially comfort functions to be affected and only afterwards where applicable for working functions to be affected. For less demanding applications, however, it is also conceivable to bring both proportional valves 44, 46 synchronously into the (completely) closed position thereof.

In this case, the control unit 24 draws a conclusion that there is a power requirement, which exceeds the conveying capacity of the hydraulic pump 18, of the primary and secondary hydraulic consumers 22a, 22b, 22c, 22d if the hydraulic pump 18 takes up an operating state which indicates a maximum displacement volume and at the same time a permissible pressure difference between the system pressure P, which is applied at the conveying outlet 20 of the hydraulic pump 18, and the maximum reported load pressure LS_P1S, LS_P1B, LS_P2, LS_P3 is fallen below. Depending on the hydraulic pump 18 used, the pressure difference is in the range from 10 to 30 bar and ensures an adjustment, which is tolerant with respect to pressure-reducing power losses of the reported load pressure LS_P1S, LS_P1B, LS_P2, LS_P3 communicated to the control unit 24, of the displacement volume. In order to detect the system pressure P, a pressure sensor 56 which is associated with the conveying outlet 20 of the hydraulic pump 18 and the sensor signals of which are supplied to the control unit 24 for evaluation is used.

The control unit 24 recognizes the operating state, which indicates a maximum displacement volume, of the hydraulic pump 18 by evaluating the pump swivel angle $\alpha$. In this case, the displacement volume increases continuously with the value of the pump swivel angle $\alpha$. Accordingly, the available conveying capacity of the hydraulic pump 18 being reached can be recognized in that the pump swivel angle $\alpha$ takes up a completely redirected state in the direction of an end stop. Reaching such an operating state constitutes a reliable indication of a potentially imminent inadequate supply of the primary hydraulic consumer 22a, 22b. If this critical state is not reached, the two proportional valves 44, 46 are in their completely open position.

In order to prevent damage, caused by excess pressure, to the hydraulic system 10 or the hydraulic consumers 22a, 22b, 22c, 22d or peripheral components which are operated therewith, there is provision for the system pressure P which is applied at the conveying outlet 20 of the hydraulic pump 18 to be limited by the control unit 24 by adapting the pump swivel angle $\alpha$ and therefore the displacement volume. The system pressure P is limited in this case in accordance with a permissible maximum value in the order of magnitude from 200 to 250 bar.

Furthermore, the supply pressure P_P1S which is provided for operating the hydrostatic vehicle steering system is limited by the control unit 24 by adapting the pump swivel angle $\alpha$ and therefore the displacement volume of the hydraulic pump 18. The limitation is carried out to a value below the permissible maximum value of the system pressure P and is in the order of magnitude of from 170 to 200 bar. The current supply pressure P_P1S is derived by the control unit 24 from the reported load pressure LS_P1S which is communicated by the hydrostatic vehicle steering system to the control unit 24 taking into consideration the pressure difference which decreases across the throttle element 40.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the drawings, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. An apparatus for operating a load-controlled hydraulic supply of an agricultural tractor, comprising:
 a hydraulic pump which is adjustable with respect to a displacement volume for supplying pressurized hydraulic fluid;
 an actuator to adjust a pump swivel angle of the hydraulic pump;
 a swivel angle sensor to detect the pump swivel angle;
 a proportional valve having an electrical actuator;
 a primary hydraulic consumer to carry out a superordinate hydraulic function and to be directly connected to a conveying outlet of the hydraulic pump;
 a secondary hydraulic consumer to carry out a subordinate hydraulic function and to be connected to the conveying outlet of the hydraulic pump via the proportional valve;
 a first pressure sensor to detect a system pressure at the conveying outlet of the hydraulic pump;
 a second pressure sensor to detect a load pressure of the primary hydraulic consumer;
 a third pressure sensor to detect a load pressure of the secondary hydraulic consumer; and
 a control unit, including a processer and memory, configured to:
  communicate with the actuator, the swivel angle sensor, the electrical actuator, the first pressure sensor, the second pressure sensor, and the third pressure sensor,
  conclude a required power exceeds a conveying capacity of the hydraulic pump when the control unit recognizes the hydraulic pump is in an operating state indicating a maximum displacement volume by evaluating the pump swivel angle detected via the swivel angle sensor and the control unit recognizes a pressure difference between the system pressure detected via the first pressure sensor and a highest reported load pressure of the primary and secondary hydraulic consumers detected via the second and third pressure sensors falls below an admissible pressure difference, and move the proportional valve into a closed valve position via the electrical actuator electrically actuated by the control unit when the control unit concludes the required power exceeds the conveying capacity of the hydraulic pump.

2. The apparatus of claim 1, further comprising:
a second secondary hydraulic consumer which can be connected to the conveying outlet of the hydraulic pump via a second proportional valve, and wherein the control unit is configured to move the first and second proportional valves into closed positions synchronously to reduce the required power in accordance with the conveying capacity of the hydraulic pump.

3. The apparatus of claim 1, further comprising:
a second secondary hydraulic consumer which can be connected to the conveying outlet of the hydraulic pump via a second proportional valve, and wherein the control unit is configured to move the first and second proportional valves into closed positions in a predetermined sequence to reduce the required power in accordance with the conveying capacity of the hydraulic pump.

4. The apparatus of claim 1, wherein the control unit is configured to limit the system pressure at the conveying outlet of the hydraulic pump by adjusting the pump swivel angle of the hydraulic pump via the actuator electrically actuated by the control unit.

5. The apparatus of claim 1, wherein the primary hydraulic consumer includes a hydraulic braking system.

6. The apparatus of claim 5, wherein the primary hydraulic consumer includes a hydrostatic vehicle steering system with a steering orbitrol and a pressure control valve connected upstream of the steering orbitrol and actuated in accordance with a pressure difference which decreases across a throttle element in accordance with a reported load pressure representing a load requirement of the hydrostatic vehicle steering system.

7. The apparatus of claim 1, wherein the control unit is configured to limit a supply pressure provided for operating the primary hydraulic consumer by adjusting the pump swivel angle of the hydraulic pump via the actuator electrically actuated by the control unit.

8. An agricultural tractor having an apparatus for operating a load-controlled hydraulic supply, comprising:
a hydraulic pump which is adjustable with respect to a displacement volume for supplying pressurized hydraulic fluid;
an actuator to adjust a pump swivel angle of the hydraulic pump;
a swivel angle sensor to detect the pump swivel angle;
a proportional valve having an electrical actuator;
a primary hydraulic consumer to carry out a superordinate hydraulic function and to be directly connected to a conveying outlet of the hydraulic pump;
a secondary hydraulic consumer to carry out a subordinate hydraulic function and to be connected to the conveying outlet of the hydraulic pump via the proportional valve;
a first pressure sensor to detect a system pressure at the conveying outlet of the hydraulic pump;
a second pressure sensor to detect a load pressure of the primary hydraulic consumer;
a third pressure sensor to detect a load pressure of the secondary hydraulic consumer; and
a control unit, including a processer and memory, configured to:
communicate with the actuator, the swivel angle sensor, the electrical actuator, the first pressure sensor, the second pressure sensor, and the third pressure sensor,
conclude a required power exceeds a conveying capacity of the hydraulic pump when the control unit recognizes the hydraulic pump is in an operating state indicating a maximum displacement volume by evaluating the pump swivel angle detected via the swivel angle sensor and the control unit recognizes a pressure difference between the system pressure detected via the first pressure sensor and a highest reported load pressure of the primary and secondary hydraulic consumers detected via the second and third pressure sensors falls below an admissible pressure difference, and
move the proportional valve into a closed valve position via the electrical actuator electrically actuated by the control unit when the control unit concludes the required power exceeds the conveying capacity of the hydraulic pump.

9. The agricultural tractor of claim 8, further comprising:
a second secondary hydraulic consumer which can be connected to the conveying outlet of the hydraulic pump via a second proportional valve, and wherein the control unit is configured to move the first and second proportional valves into closed positions synchronously to reduce the required power in accordance with the conveying capacity of the hydraulic pump.

10. The agricultural tractor of claim 8, further comprising:
a second secondary hydraulic consumer which can be connected to the conveying outlet of the hydraulic pump via a second proportional valve, and wherein the control unit is configured to move the first and second proportional valves into closed positions in a predetermined sequence to reduce required power in accordance with the conveying capacity of the hydraulic pump.

11. The agricultural tractor of claim 8, wherein the control unit is configured to limit the system pressure at the conveying outlet of the hydraulic pump by adjusting the pump swivel angle of the hydraulic pump via the actuator electrically actuated by the control unit.

12. The agricultural tractor of claim 8, wherein the primary hydraulic consumer includes a hydraulic braking system.

13. The agricultural tractor of claim 12, wherein the primary hydraulic consumer includes a hydrostatic vehicle steering system with a steering orbitrol and a pressure control valve connected upstream of the steering orbitrol and actuated in accordance with a pressure difference which decreases across a throttle element in accordance with a reported load pressure representing a load requirement of the hydrostatic vehicle steering system.

14. The agricultural tractor of claim 8, wherein the control unit is configured to limit a supply pressure provided for operating the primary hydraulic consumer by adjusting the pump swivel angle of the hydraulic pump via the actuator electrically actuated by the control unit.

* * * * *